Oct. 9, 1962
C. KUILMAN
3,057,385
ONION PEELING MACHINE
Filed Feb. 12, 1960
2 Sheets-Sheet 1
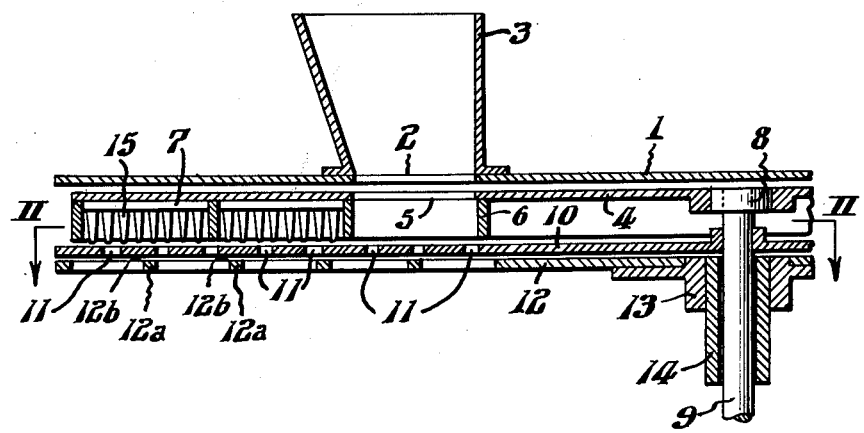
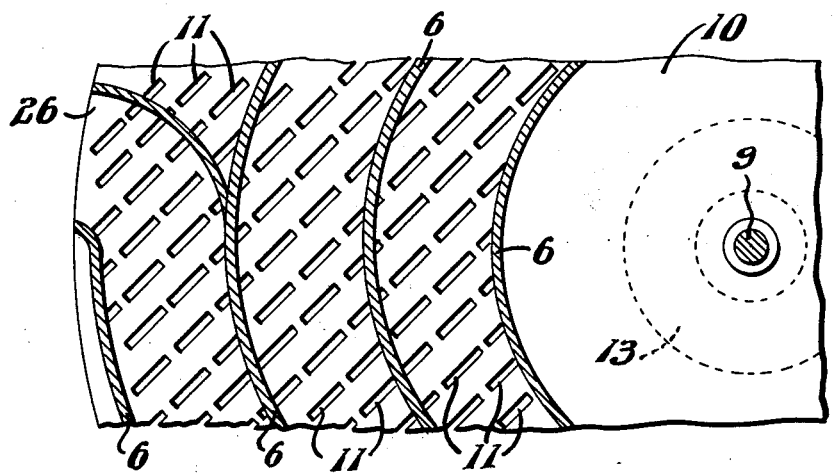
INVENTOR.
Cornelis Kuilman,
BY
Paul & Paul
ATTORNEYS.

Oct. 9, 1962 C. KUILMAN 3,057,385
ONION PEELING MACHINE
Filed Feb. 12, 1960 2 Sheets-Sheet 2
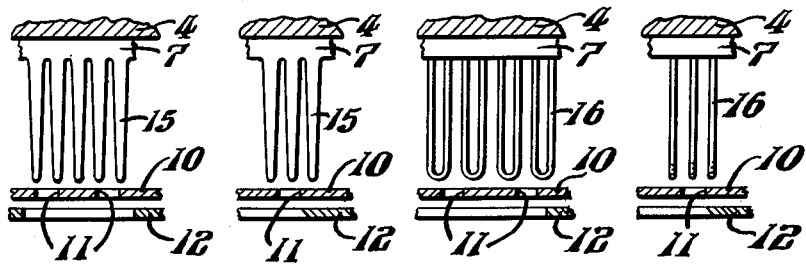
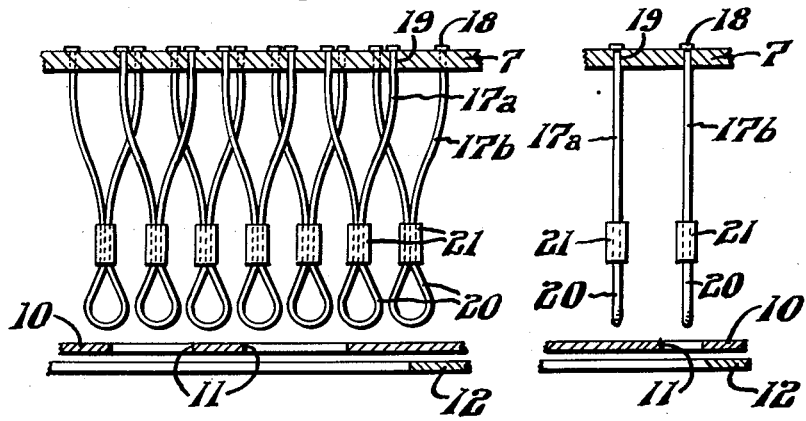
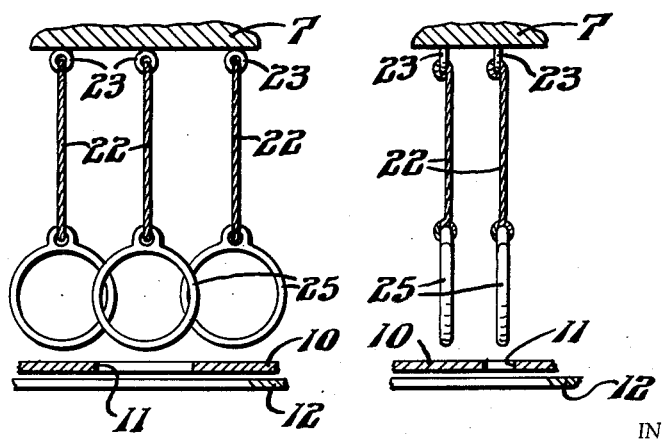
INVENTOR.
Cornelis Kuilman,
BY
Paul & Paul
ATTORNEYS.

United States Patent Office 3,057,385
Patented Oct. 9, 1962

3,057,385
ONION PEELING MACHINE
Cornelis Kuilman, Oudkarspel, Netherlands, assignor to Hendrik Hart, Oudkarspel, Netherlands
Filed Feb. 12, 1960, Ser. No. 8,287
9 Claims. (Cl. 146—43)

The invention relates to a machine for peeling agricultural produce, such as silver onions or the like, for example, wherein a plate provided with knives rapidly rotates with respect to a plate provided with slots, the produce to be peeled being positioned on said slotted plate, a multiplicity of yieldable members being mounted above the slotted plate for holding back and revolving the onions in order to facilitate the cutting operation. According to this invention, said yieldable members may be mounted on the bottom side of another plate, located above said slotted plate with respect to which said slotted plate receives a rotative movement. The plate bearing said members preferably though not necessarily receives a small horizontal shaping movement.

With prior art machines of this general type, the difficulty arose, that not all the onions were peeled and that a relatively large percentage of them had to be re-peeled. One such machine is shown in British Patent No. 725,521, published March 2, 1955, in which the onion-contacting members were metal chains, hanging down, which when broken, could cause serious damage to the knives.

This invention provides a novel machine of this general type, by means of which the onions can be peeled more satisfactorily and the re-peeling time (i.e. the time necessary for re-peeling the onions and the like which have not been peeled completely the first time) for a given quantity can be considerably reduced. Practice has shown that, in accordance with this invention, the re-peeling time can be reduced to less than one tenth of the time necessary up to now.

One of the important features whereby the invention attains this result, resides in the fact that the down-hanging members are made of a flexible resilient material.

Moreover it has been proved that particularly good results are obtained, if the yieldable members at their lower ends have curved portions.

According to a further embodiment of the invention, said yieldable members accordingly are preferably hairpin-shaped.

A very satisfactory further embodiment consists of a bent thread made of plastic, having a loop at its lower end, the bent portion of the thread being held together at the top of the loop by means of a small sleeve.

Finally it is also possible within the scope of the invention to affix rings to the lower ends of the yieldable members. These rings can be fastened to flexible threads or to yielding needles or to equivalent fastening members.

The invention is further illustrated by the accompanying drawing, in which

FIGURE 1 shows a schematic cross-section of part of the machine according to the invention;

FIGURE 2 shows a section through the line II—II of FIGURE 1;

FIGURES 3 and 4 show enlarged views of a first embodiment of the yielding members according to the invention, parts being shown in section;

FIGURES 5 and 6 show enlarged views of another embodiment of the yielding members according to the invention, parts being shown in section;

FIGURES 7 and 8 show enlarged views of another embodiment of the yielding members according to the invention, parts being shown in section; and FIGURES 9 and 10 show enlarged views of still another embodiment of the invention, parts being shown in section.

The machine according to FIGURE 1 has an upper plate 1, which can be stationarily mounted in any suitable way not shown. This upper plate has an opening 2, on which a funnel 3 is positioned. Underneath this upper plate a disk 4 is present, which in the embodiment illustrated does not receive a rotative movement, but is shaken by means of an eccentric cam 8 mounted on a rotatable shaft 9, which shaft may be rotated by any suitable means, not shown in the drawings. As the eccentric cam 8 is rotated, it presses against plate 4 and forces said plate backward and forward, i.e., toward left and right as seen in FIG. 1, in a radial direction relative to plate 10. Disk 4 may be supported by any means, not shown, which prevents any rotative movement of disk 4. In this plate 4 an opening 5 leads to the first path of a spiral conduit formed by a wall 6, attached to the plate 4. In this conduit, except at the opening 5, a set of yieldable members 15 is present, which, via a bearing strip 7 are attached to the upper plate 4 and are hanging down. Axial movement with respect to the eccentric cam 8 is also prevented by any suitable means not pertaining to the invention.

Underneath the plate 4 a plate 10 is driven rotatively by the shaft 9 and has slots 11. Closely spaced beneath it, a plate 12 provided with knives or cutters 12a is attached to boss 14 by means of a fastening device 13 and receives a rotational speed preferably considerably faster than that of the shaft 9. Preferably, but not necessarily, the shaft 9 and the boss 14 and, consequently, the disk 10 and the disk 12 rotate in opposite directions. The driving means for shaft 9 and boss 14 may be of any suitable construction known per se, and not shown in the drawings.

FIGURE 2 is a top view showing a portion of the slotted plate 10. The spiral conduits 6 attached to the plate 4 positioned above them are shown in section. The spiral terminates at the location identified by the number 26, between the paths 6, and beneath the termination or exit 26 a receiving funnel for the peeled produce can be positioned. The slots 11 in the shown embodiment are straight, but they also can be curved. Preferably they are shaped in such a way that they always intersect the radii of plate 4 at the same angle, for instance 45°. Preferably the slots are so positioned that looking in the direction of rotative movement the slots run from the centre towards the periphery.

The plate 4 is adjustable in a vertical direction with respect to the plate 10, in order to enable adjusting for various agricultural produce, such as onions of different sizes. The adjusting means, not shown, does not per se constitute any part of this invention. The knives 12a of the knifeplate 12 are positioned with their cutting edges 12b very close to plate 10.

More particularly, the invention relates to the members present between the spiral conduits, for holding back and revolving the agricultural produce to be peeled.

FIGURES 3 and 4 show views of these members respectively in a tangential and a radial direction. Here needles 15 depend from an attaching strip 7 with which they are integrally formed. It will be understood that the attaching strip 7 and the needles 15 may be separately constructed, if desired, and the needles 15 mounted to the strip 7 by any means suitable to the purpose. The attaching strip 7, furthermore, may be secured to the undersurface of plate 4 by suitable means such as riveting, bolting, or even by application of an adhesive. The needles 15 must be made of a flexible material, for instance plastic, rubber or like materials, which must be suitable for attaching to the strip 7. The horizontal distribution of the needles can be relatively arbitrary and the needles must possess suitable stiffness, on the one hand for not retaining the produce completely to jam the machine and, on the other hand, for exerting sufficient force on the produce to be peeled.

FIGURES 5 and 6 show another embodiment with hairpin-shaped members 16. These, too, are of flexible material. The hairpins lie in the machine with their plane in a radial direction and for this reason they are provided with a curved lower portion against which the onions or the other produce to be peeled, strike. The needles then will yield somewhat, and the opportunity is created for the onions, because of their irregular shapes (head and tail), to be caught in the loop. This has proved to have a very good effect on the peeling of agricultural produce, since the catching of either a head or a tail enhances the ability of the cutting members to cut the corresponding tail or head.

FIGURE 7 shows an embodiment, which can be made very simply in practice and with which extremely good results have been also obtained. These members can be described as relatively broad hairpins, the legs of which somewhere along their lengths are held together by means of small sleeves 21. As is clear, the members 17a are mounted in a first row and the members 17b in a second row behind it, as is also manifest from FIGURE 8.

This staggered position of the members can also be used in the embodiment of FIGURES 3, 4, 5 and 6. The eyes 20 at the lower end, as experiments have shown, have a very favourable influence on the percentage of unpeeled rejects. The fastening can be simply carried out by slipping the ends 18 and 19 of the members 17b and 17a respectively through a plate. These members have the advantage of possessing a rather great rigidity in a radial direction, i.e. to the left and to the right in FIGURE 7 of the drawing, whereas they are far more flexible in the direction of the movement of the onions (in FIGURE 8 from the right to the left).

FIGURES 9 and 10 show an embodiment, wherein the members consist of rings 25 hung on threads 22. At the upper end these threads are put into eyes 23 fastened in any suitable way to plate 4, while the rings 25 have eyes 24 for fixing the thread at the lower end.

The threads 22 can be replaced by elastic needles, if desired, which can form a whole with the rings 25. The members of FIGURES 3 and 4; 5 and 6; 7 and 8; and 9 and 10, respectively have been placed along the full spiral between the conduit walls 6, except underneath the funnel 3. Preferably the planes of the members according to FIGURES 5 and 6; 7 and 8; and 9 and 10, respectively are radial in respect to the machine. In the embodiment of FIGURES 9 and 10, needles have an advantage over threads, in that the rings will always lie in radial planes.

I claim:
1. In an apparatus for peeling irregularly-shaped agricultural produce in the form of onions having head portions and tail portions, the combination which comprises a revolving bed for the produce, said bed having openings extending therethrough, cutter means operatively associated with and substantially immediately below said bed for cutting off said head and tail portions of said produce when such portions extend through any such opening, yieldable produce-engaging and retarding means extending down from above said bed and contacting said produce at a level above said bed, said yieldable means comprising a multiplicity of elongated, resilient members having a loop-shaped structure at the lower extremities thereof, said loop-shaped structure being of a size to engage the head or tail portions of an onion and adapted to retard the movement of such head or tail portion with respect to the movement of the onion, and being adapted to retard the passage of said onions on said bed but which are constructed and arranged to yield to permit such passage, and anchoring means spaced above said bed and connected to said yieldable means to maintain the upper portions of said yieldable means in a fixed position, the lower extremities of said yieldable means being free and spaced above the upper surface of said bed.

2. Apparatus according to claim 1 wherein means are provided for imparting a shaking movement to said anchoring means, thereby shaking said yieldable retarding means in the course of the peeling operation.

3. Apparatus according to claim 2, wherein said yieldable means are vertically arranged and have the form of elongated strips.

4. Apparatus according to claim 2, wherein said yieldable means are generally loop shaped in the area of their lower extremities.

5. Apparatus according to claim 1, wherein said yieldable means are hairpin-shaped, both legs of the hairpin being directed upwards and attached to said anchoring means, the planes of said legs being radially arranged with respect to the circle of rotation of said bed.

6. Apparatus according to claim 1, wherein said yieldable means are generally wire-shaped and comprise a pair of wire members attached to said anchoring means at radially-spaced points and formed into a loop at the lower end of said yieldable means and wherein a ring-shaped member is applied to and surrounds and constricts said wire members just above said loop.

7. Apparatus according to claim 1, wherein said yieldable means comprises a ring hung on the end of a thread.

8. In an apparatus for peeling irregularly-shaped agricultural produce in the form of onions having head portions and tail portions, the combination which comprises a revolving plate providing a bed for the produce, said bed plate having openings extending therethrough, a cutter disk beneath said bed plate provided with cutter means operatively associated with and substantially immediately below said bed plate for cutting off said head and tail portions of said produce when such portions extend through any such openings, means for driving said bed plate and said cutter disk for movement relative to one another, wall means forming a spirally arranged path on said bed plate forming a continuous, outwardly directed spiral for passage of said produce to the periphery of said bed plate, and yieldable produce-engaging and retarding means extending down from above said bed plate and contacting said produce at a level above said bed plate, said yieldable means comprising a multiplicity of downwardly-extending elongated, resilient members which retard the passage of said onions on said bed plate but which yield to permit such passage, said yieldable means having greater resiliency in a radial direction than in a circumferential direction with respect to the rotation of said bed plate, anchoring means spaced above said bed plate and connected to said yieldable means to maintain the upper portions of said yieldable means in a fixed position, the lower extremities of said yieldable means being free.

9. Apparatus according to claim 8, wherein said driving means is constructed and arranged to rotate said cutter disk faster than said bed plate.

References Cited in the file of this patent
UNITED STATES PATENTS

| | | |
|---|---|---|
| 2,791,254 | Crane | May 7, 1957 |
| 2,813,562 | Pouzoulet | Nov. 19, 1957 |
| 2,862,535 | Wilson et al. | Dec. 2, 1958 |
| 2,906,308 | Genetti | Sept. 29, 1959 |

FOREIGN PATENTS

| | | |
|---|---|---|
| 725,521 | Great Britain | Mar. 2, 1955 |